US005878996A

United States Patent [19]

[11] Patent Number: 5,878,996

Loan

[45] Date of Patent: Mar. 9, 1999

[54] LIFTING JACK WITH SAFETY AND RELEASE SYSTEM

[76] Inventor: Chung Loan, 4F, No. 6, Lane 48, Yen Chi Street, Taipei, Taiwan

[21] Appl. No.: 878,299

[22] Filed: Jun. 18, 1997

[51] Int. Cl.[6] .......... B60P 1/48

[52] U.S. Cl. .......... 254/8 B

[58] Field of Search .......... 187/206, 208; 254/8 B

*Primary Examiner*—David A. Scherbel
*Assistant Examiner*—Bnejamin M. Halpern
*Attorney, Agent, or Firm*—Pro-Techtor International Services

[57] ABSTRACT

The present invention relates to a lifting jack with safety and release system for lifting an object, comprising: a main body; a driving system; a support system, hingedly mounted on the main body and undergoing a raising and a lowering movement, as driven and released by the driving system; a safety system, further comprising a ratchet, mounted on the main body, a pawl, which during the raising movement engages with the ratchet for blocking any unintended lowering of the support system, and a lever with a rear end and with a front end below the pawl, for disengaging the pawl from the ratchet by lowering its rear end; and a release system, further comprising a catch, hingedly mounted on the main body, having a nose for engaging with the rear end of the lever, and a spring, pulling the catch towards the rear end of the lever; wherein, for lowering the support system, the rear end of the lever is pressed down manually and then held by the nose of the catch, such that the pawl stays disengaged from the ratchet automatically, while the support system is lowered.

7 Claims, 7 Drawing Sheets

LIFTING JACK WITH SAFETY AND RELEASE SYSTEM

BACKGROUND OF THE INVENTION

1. Field of the Invention

The present invention relates to a lifting jack with safety and release system, particularly to a lifting jack with safety and release system for safe and convenient lowering of a lifted object.

2. Description of Related Art

A conventional hydraulic lifting jack has no safety system, due to restricted space and for simplicity. When the hydraulic cylinder breaks or leaks, the lifted object will suddenly or at least slowly come down unnoticed, posing a danger for the unaware user.

Therefore U.S. Pat. No. 5,618,029 discloses a lifting jack safety system, wherein a safety pawl is attached to the support arm or link arm on the top of the lifting jack, engaging with an asymmetrically saw-toothed ratchet. When the lifting jack is raised, the pawl glides over the teeth of the ratchets. At the same time, it is blocked from moving back, preventing the lifting jack from lowering. To lower the lifting jack intentionally, the pawl is turned away and thus no longer blocked by the ratchet. This safety system prevents unwanted lowering of the lifting jack. However, when the lifting jack is lowered, the pawl has to be constantly kept away from the ratchet, which makes it uncomfortable to use.

SUMMARY OF THE INVENTION

An object of the present invention is to provide a lifting jack with safety and release system, which is easy to use.

Another object of the present invention is to provide a lifting jack with safety and release system of high safety.

The present invention can be more fully understood by reference to the following description and accompanying drawings.

DETAILED DESCRIPTION OF THE PREFERRED EMBODIMENT

Figure 1:
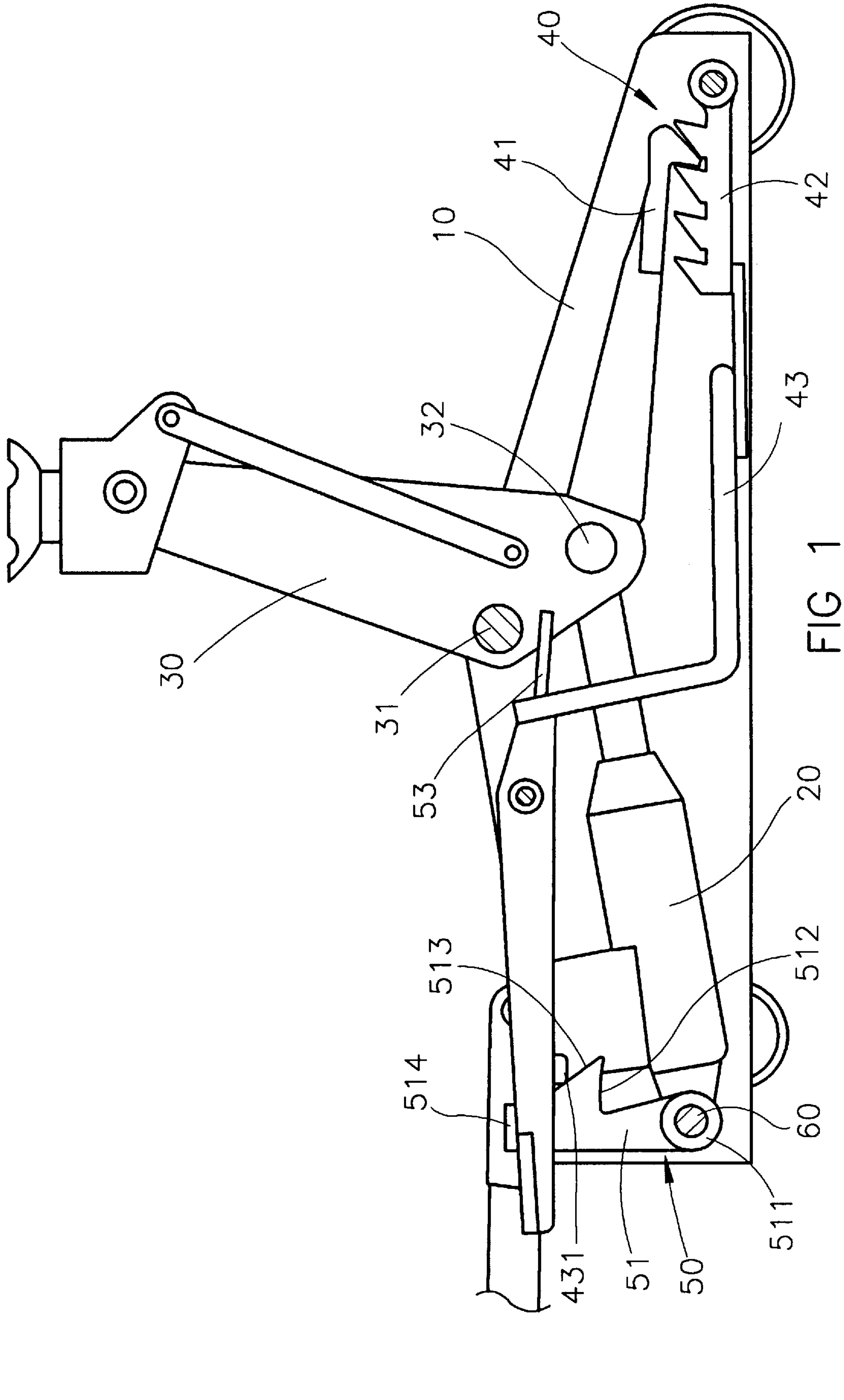
FIG. 1 is a side view of the lifting jack with safety and release system of the present invention in an elevated state.
Figure 2:
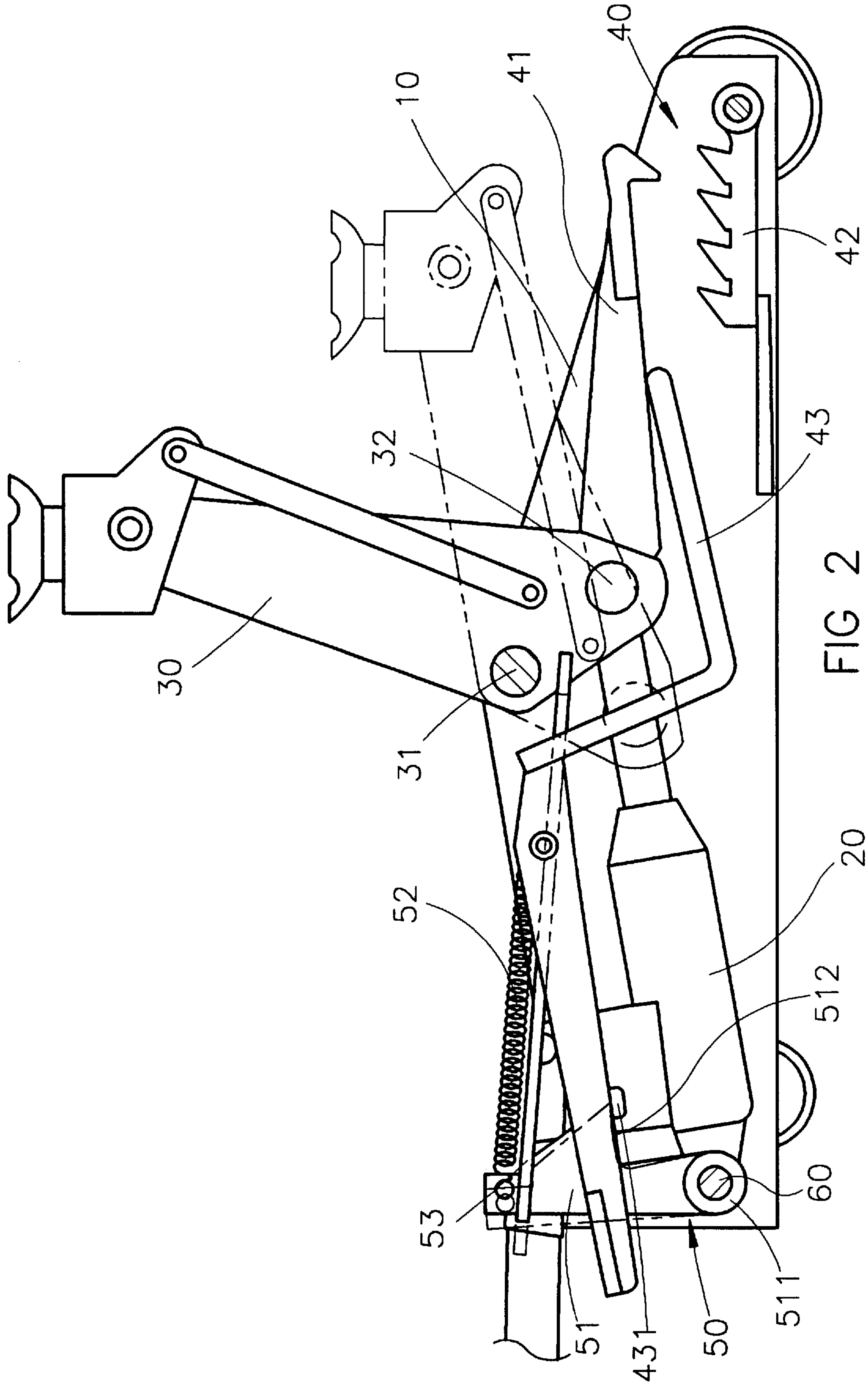
FIG. 2 is a schematic illustration of the lifting jack with safety and release system of the present invention, when lowered.
Figure 3:
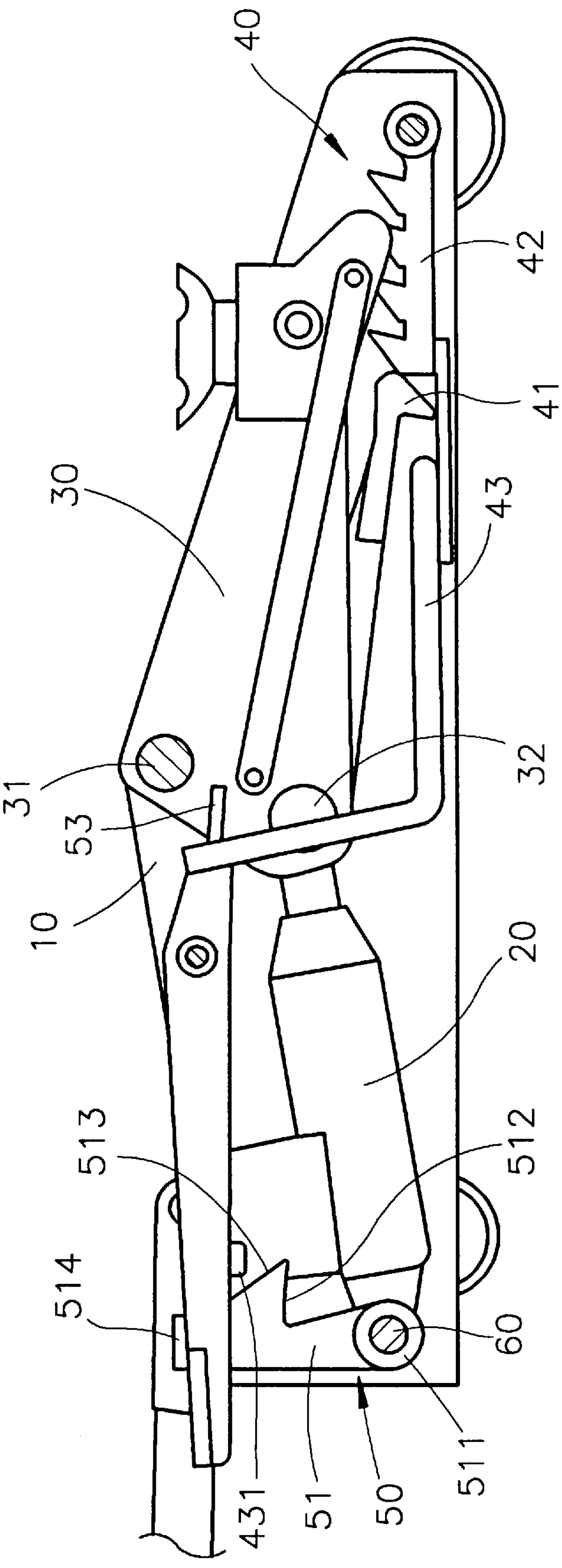
FIG. 3 is a side view of the lifting jack with safety and release system of the present invention in a lowered state.
Figure 5:
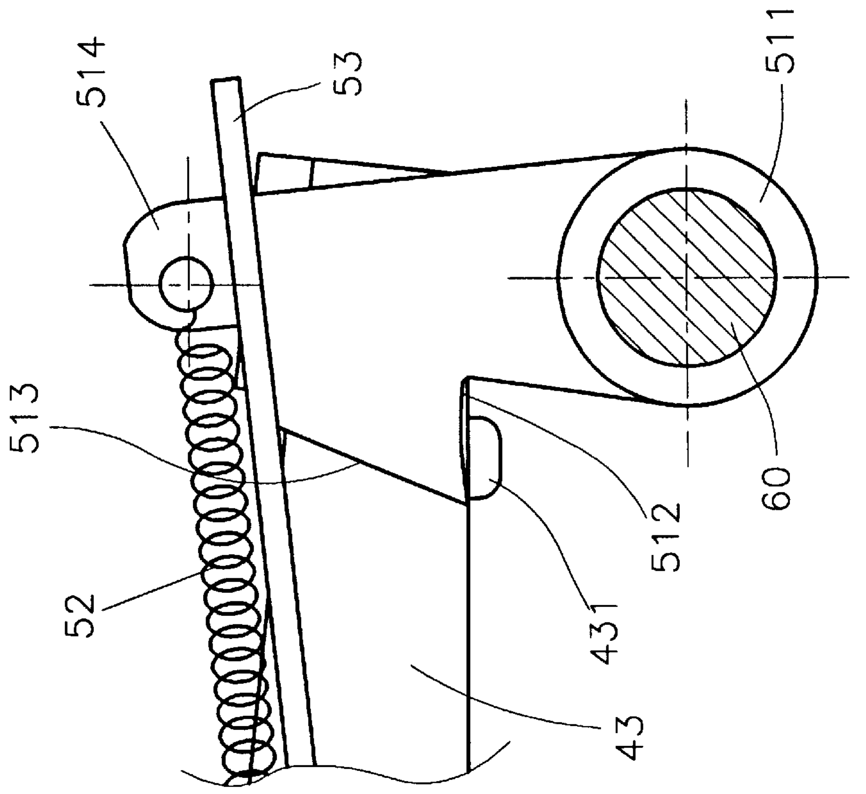
FIG. 5 is a schematic illustration of the lever, when pressed down, and of the catch of the present invention.
Figure 4:
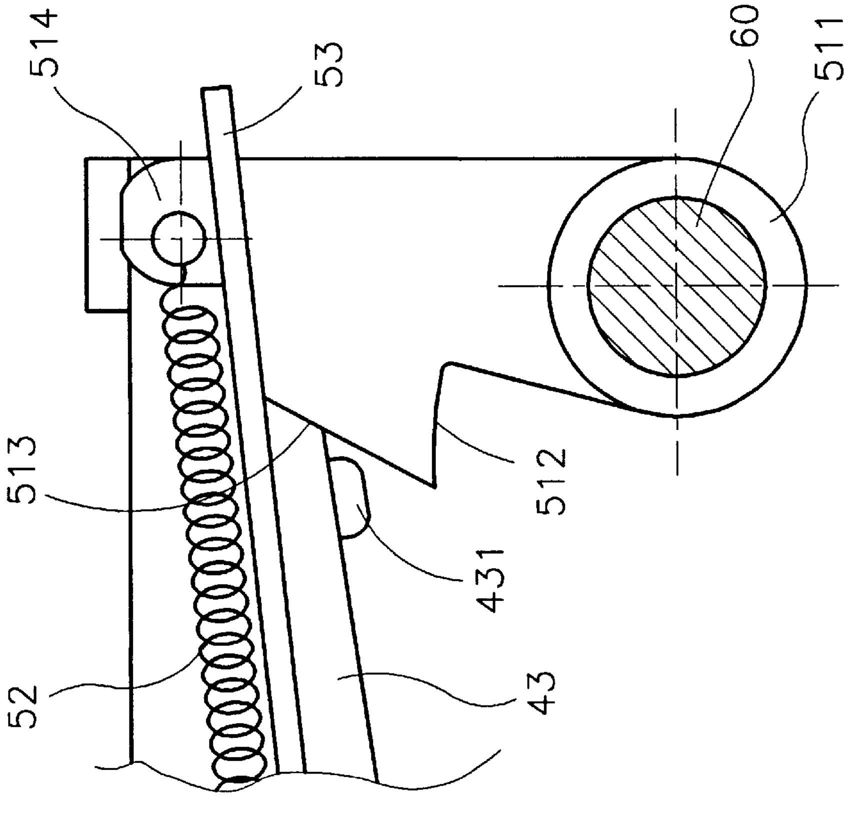
FIG. 4 is a schematic illustration of the lever, when not pressed down, and of the catch of the present invention.

As shown in FIGS. 1–3, the lifting jack with safety and release system of the present invention comprises a main body 10, a driving system 20, a support system 30, a safety system 40, and a release system 50. The lifting jack has a front end, facing the object to be lifted, and a rear end. The support system 30 has close to its rear end a first fulcrum 31, where it is connected to the main body 10 in the middle between the front and back ends thereof. The rear end of the support system 30 is connected to the driving system 20 at a second fulcrum 32 and driven froward in a revolving movement around the first fulcrum 31, so as to raise the front end of the support system 30 with an object resting thereon.

The safety system 40 comprises a pawl 41, a ratchet 42 and a lever 43. The pawl 41 has a rear end, which is connected to the second fulcrum 32. The ratchet 42 is fastened on the main body 10 at the front end thereof, engaging with the pawl 41. It allows a forward movement of the pawl 41, but blocks a backward movement thereof. The lever 43 has a rear end 431 close to the rear end of the main body 10 and extends forward to a position below the pawl 41. When the support system 30 is raised, the pawl 41 moves forward, pushed by the rear end of the support system 30 at the second fulcrum 32 and gliding over the ratchet 42. The ratchet 42 blocks a backward movement of the pawl 41 and thus prevents lowering of the support system 30. By pressing down the rear end 431, the front end of the lever 43 is raised, disengaging the pawl 41 from the ratchet 42 and allowing the support system 30 to be lowered.

As shown in all Figs., the release system 50 has a catch 51, a spring 52 and a control bar 53. When the rear end 431 of the lever 43 is pressed down, disengaging the pawl 41 from the ratchet 42, the catch 51 holds it down to prevent the pawl 41 engaging with the ratchet 42 again. So the support system 30 is allowed to lower unhindered, even if the rear end 431 of the lever 43 is not held down manually.

Referring to FIGS. 1–5, the catch 51 is a vertical plate with a lower end 511, mounted close to the rear end 431 of the lever 43. It is connected to the main body 10, moving forward and backward, while rotating around a horizontal shaft 60 of the main body 10 through its lower end 511. If the lower end 511 does not fit on the shaft 60 of the main body 10, an external shaft is usable, as well, to mount the catch 51. The spring 52 is connected to the upper end of the catch 51 at a projection 514 thereon. Its elastic force seeks to pull the catch 51 forward. The catch 51 has a forward pointing nose 512 for blocking the rear end 431 of the lever 43 from moving up, after it has been pressed down. The nose 512 has an upper slope 513. When the rear end 431 of the lever 43 is pressed down, it glides along the slope 513, pushing the catch 51 back against the elastic force of the spring 52. As soon as the rear end 431 has passed the nose 512, the catch 51 is pulled forward by the spring 52, holding down the rear end 431.

Figure 6:
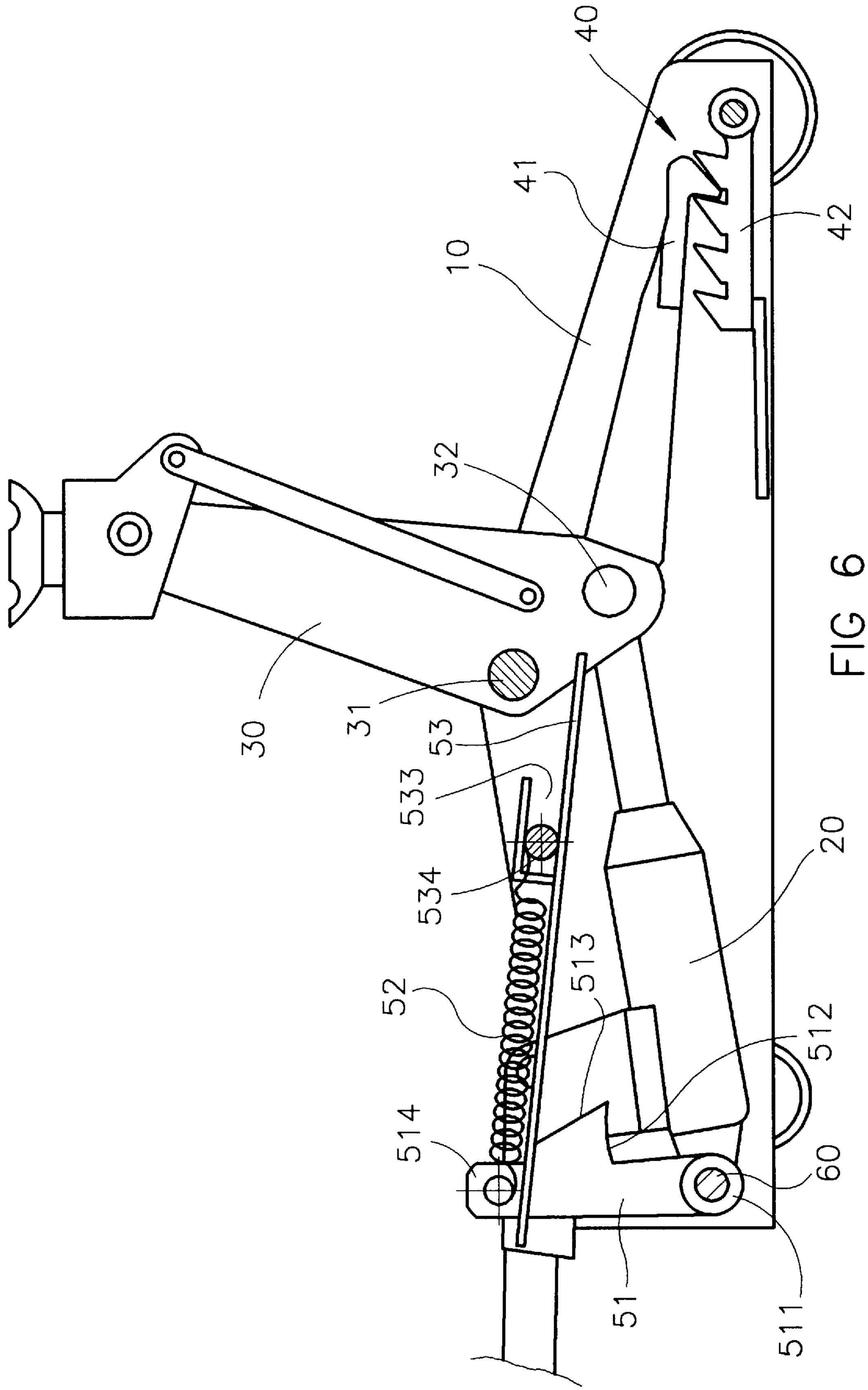
FIG. 6 is a schematic illustration of the release system of the present invention.
Figure 7:
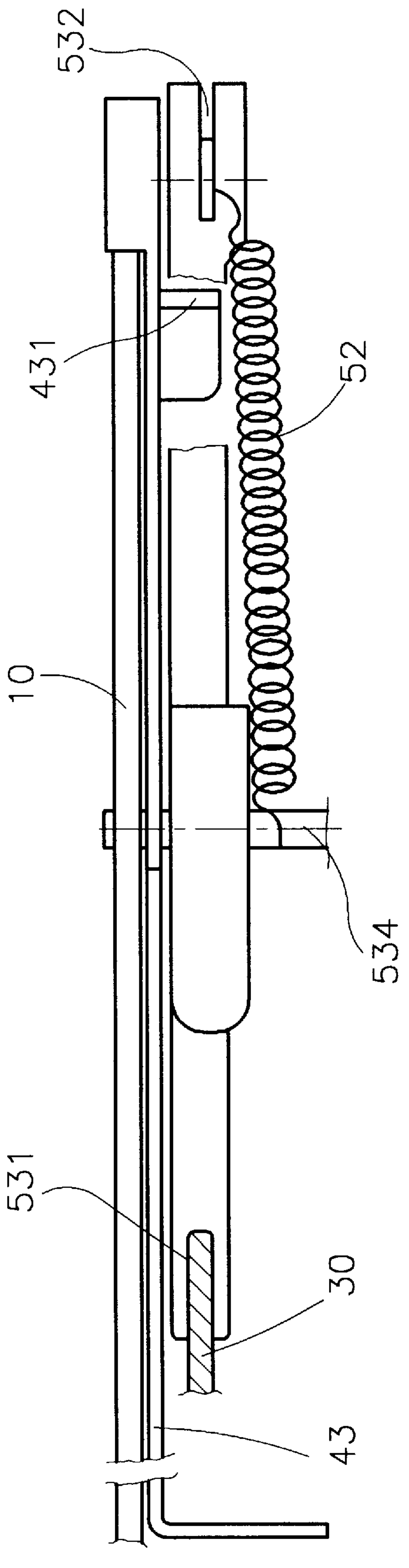
FIG. 7 is a top view of the release system of the present invention, when the support system moves down.
Figure 8:
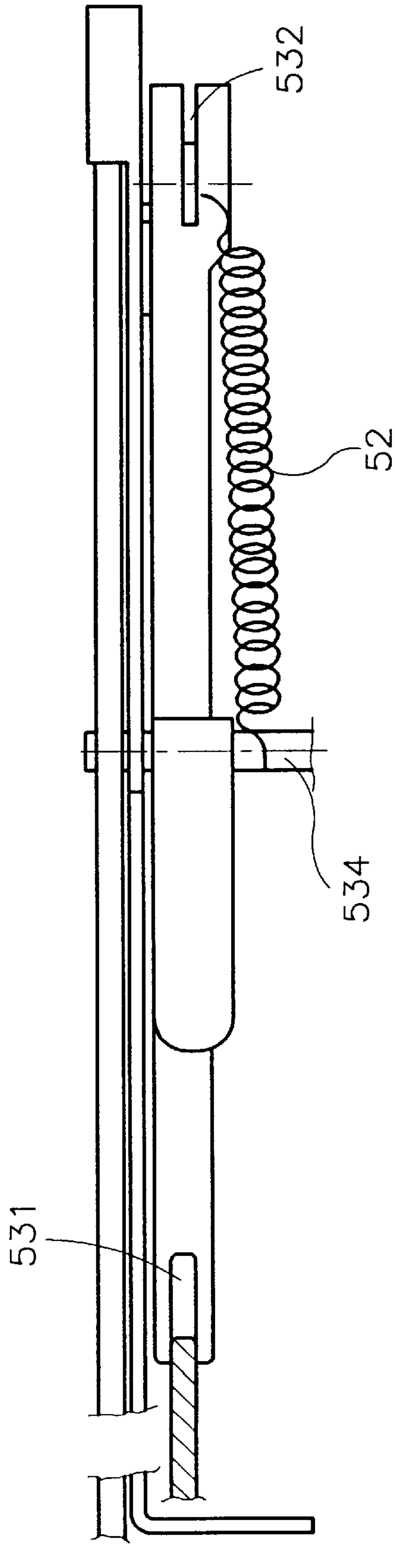
FIG. 8 is a top view of the release system of the present invention, when the support system moves up.

As shown in FIGS. 6–8, the control bar 53 has a front end, which leans against the support system 30 close to the second fulcrum 32, and a rear end at the projection 514. After the support system 30 has been lowered, it pushes back the control bar 53. An incision 531 of suitable depth is cut into the front end of the control bar 53, which is entered by the support system 30 and fixed thereto. Another incision 532 of suitable depth is cut into the rear end of the control bar 53, which is glidingly entered by the projection 514. The distance between the incisions 531 and 532 is larger than the distance between the second fulcrum 32 and the rear end 431 of the lever 43. Therefore, after the support system 30 has been lowered, its rear end pushes back the catch 51 via the control bar 53 sufficiently far to cause the nose 512 to unblock an upward movement of the rear end 431 of the lever 43. After the rear end 431 has moved up, the pawl 41 engages with the ratchet 42. So next time, when the support system 30 is raised, it will again be protected from unintended lowering.

To the middle of the control bar 53 a longitudinal gliding path 533 is attached, accommodating a transverse bar 534. The transverse bar 534 is fastened to the main body 10. When the support system 30 moves up and down, the control bar 53 glides forward and backward, respectively, guided by the transverse bar 534 in the gliding path 533.

All structural parts cooperate in a way that, to disengage the pawl 41 from the ratchet 42, it is only necessary to press down the rear end 431 of the lever 43. Once pressed down, the lever 43 is held by the catch 51 of the release system 50 and need not be held manually to keep the pawl 41 disengaged from the ratchet 42, while the support system 30 is being lowered. After the support system 30 has been lowered, the control bar 53 pushes back the catch 51, so as to release the lever 43 and allow the pawl 41 to engage with the ratchet 42 again. Thus the security system 40 will work automatically next time, when the support system 30 is raised.

While the invention has been described with reference to a preferred embodiment thereof, it is to be understood that modifications or variations may be easily made without departing from the spirit of this invention which is defined by the appended claims.

What is claimed is:

1. A lifting jack with safety and release system for lifting an object, comprising:

a main body with a front end, which faces said object, and a rear end;

a driving system;

a support system with a front end, which supports said object, and a rear end, said support system close to said rear end thereof hingedly mounted on said main body at a first fulcrum, such that said front end of said support system undergoes a raising and a lowering movement, as driven and released by said driving system, said driving system being connected to said rear end of said support system at a second fulcrum;

a safety system, further comprising a ratchet, mounted on said main body close to said front end thereof, a pawl with a front end and a rear end, which is hingedly connected to said second fulcrum, said pawl during said raising movement engaging with said ratchet for blocking any unintended lowering of said support system, and a lever with a rear end close to said rear end of said main body and a front end below said pawl, for disengaging said pawl from said ratchet by lowering said rear end of said lever; and a release system, further comprising a catch, hingedly mounted on said main body close to said rear end thereof, having a nose for engaging with said rear end of said lever, and a spring, pulling said catch towards said rear end of said lever;

wherein, for lowering said support system, said rear end of said lever is pressed down manually and then held by said nose of said catch, such that said pawl stays disengaged from said ratchet automatically, while said support system is lowered.

2. A lifting jack with safety and release system according to claim 1, wherein said nose has a slope for allowing said rear end of said lever to glide past said nose, when pressed down.

3. A lifting jack with safety and release system according to claim 1, wherein a control bar connects said catch to said support system close to said second fulcrum for pushing said catch away from said rear end of said lever, when said lowering movement of said support system has been finished, so as to allow said rear end of said lever to rise and said pawl to engage with said ratchet.

4. A lifting jack with safety and release system according to claim 3, wherein said control bar close to said support system has a longitudinal incision for a fast hold on said support system.

5. A lifting jack with safety and release system according to claim 3, wherein said control bar close to said catch has a longitudinal incision for a gliding connection to said catch.

6. A lifting jack with safety and release system according to claim 5, wherein said catch has a projection, connecting to said incision of said control bar and preventing said control bar from departing from said catch.

7. A lifting jack with safety and release system according to claim 3, wherein said control bar has a longitudinal glide path, which accommodates a transverse bar fixed to said main body, such that during said raising and lowering movement of said support system said control bar glides forward and backward on a fixed path.

* * * * *